E. HERISSÉ.
BAKING OVEN.
APPLICATION FILED JUNE 21, 1911.

1,009,414.

Patented Nov. 21, 1911.
5 SHEETS—SHEET 1.

Witnesses:
E. A. Jarvis.
Estelle O. Hamburger.

Inventor:
Emile Hérissé
by Manning Block
attorney.

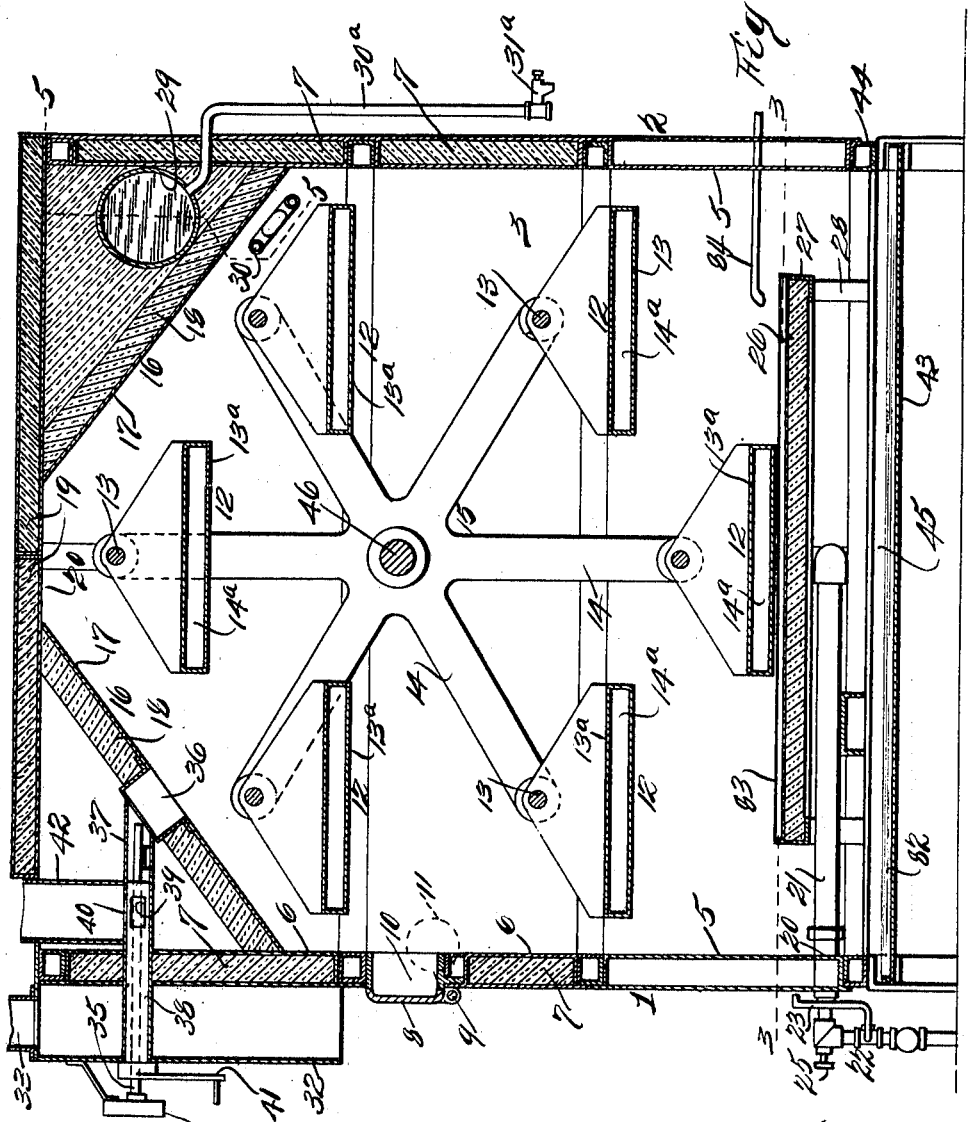

E. HÉRISSÉ.
BAKING OVEN.
APPLICATION FILED JUNE 21, 1911.
1,009,414.
Patented Nov. 21, 1911.
5 SHEETS—SHEET 3.
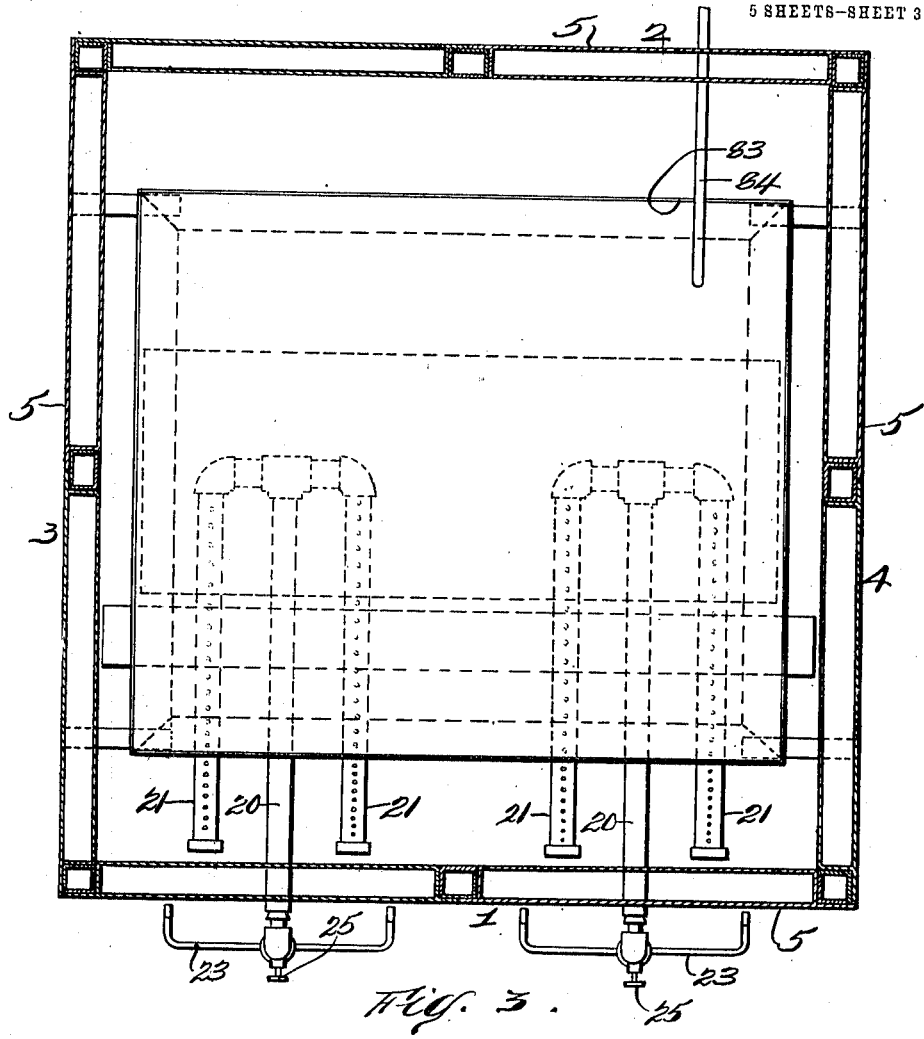
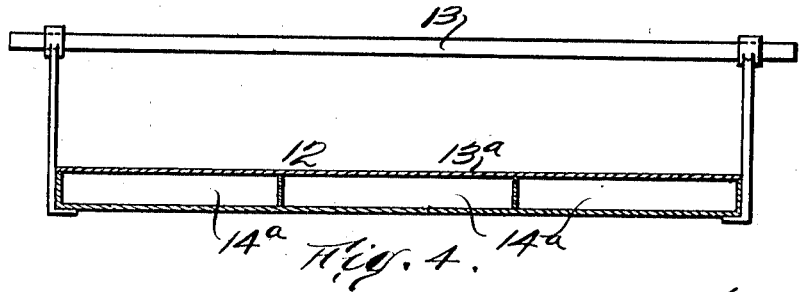

E. HÉRISSÉ.
BAKING OVEN.
APPLICATION FILED JUNE 21, 1911.

1,009,414.

Patented Nov. 21, 1911.
5 SHEETS—SHEET 4.

Witnesses:
E. A. Jarvis
Estelle O. Hamburger.

Inventor:
Émile Hérissé
by
attorney.

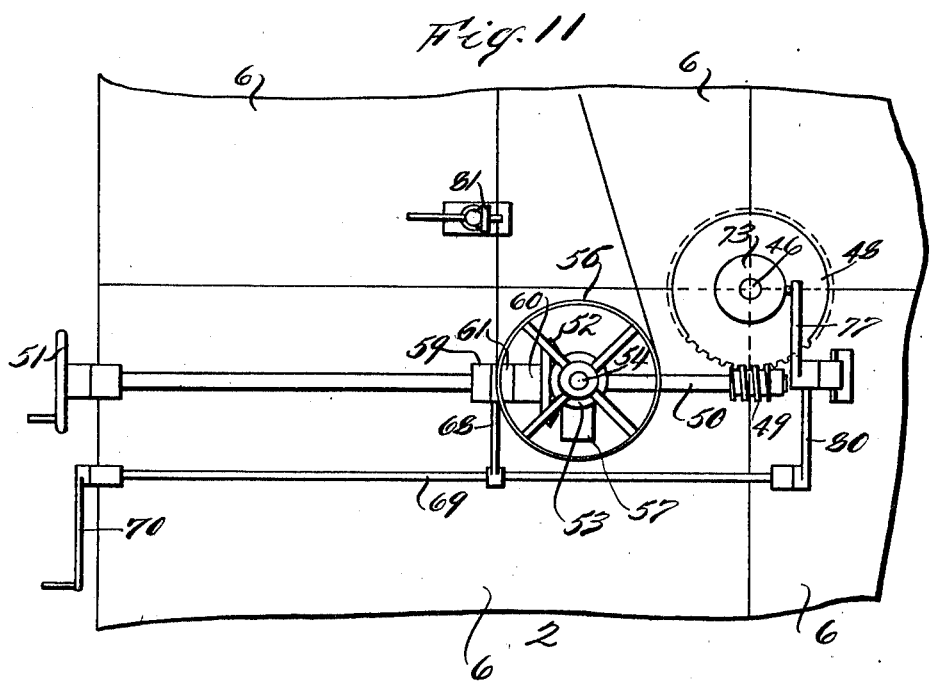

UNITED STATES PATENT OFFICE.

EMILE HÉRISSÉ, OF NEW YORK, N. Y.

BAKING-OVEN.

1,009,414.  Specification of Letters Patent.  Patented Nov. 21, 1911.

Application filed June 21, 1911. Serial No. 634,553.

*To all whom it may concern:*

Be it known that I, EMILE HÉRISSÉ, a citizen of the United States of America, residing at New York city, Manhattan borough, county and State of New York, have invented certain new and useful Improvements in Baking-Ovens, of which the following is a full, clear, and exact description.

This invention relates to an improvement in bakers' ovens, the object being to provide a composite knockdown structure that may be readily prepared for shipment and readily assembled.

A further object of my invention is to provide an oven, the walls of which for the most part are insulated or provided with means to prevent excess heat from passing therethrough, the remainder of said walls being partially insulated at the lower portion, whereby an even temperature can be maintained within the oven.

A still further object of my invention is to provide a rotary carrier which in turn is provided with cradles, preferably rotatably mounted thereupon, the said cradles being designed to support trays upon which articles to be baked are placed.

The object of providing the rotary carrier for trays is that articles, which are placed thereupon, and which are to be baked, may be continuously moved while being baked, thereby preventing the burning or scorching of said articles.

In order that the baked articles may be removed from the cradles, I provide a special device to arrest the movement of the carrier when the trays aline with the door with which one of the walls of the furnace is provided, special means being provided to prevent the lower-most tray, or rather the articles placed thereupon, from becoming overheated or overbaked.

Further features of my improved oven will hereafter appear.

Figure 1:
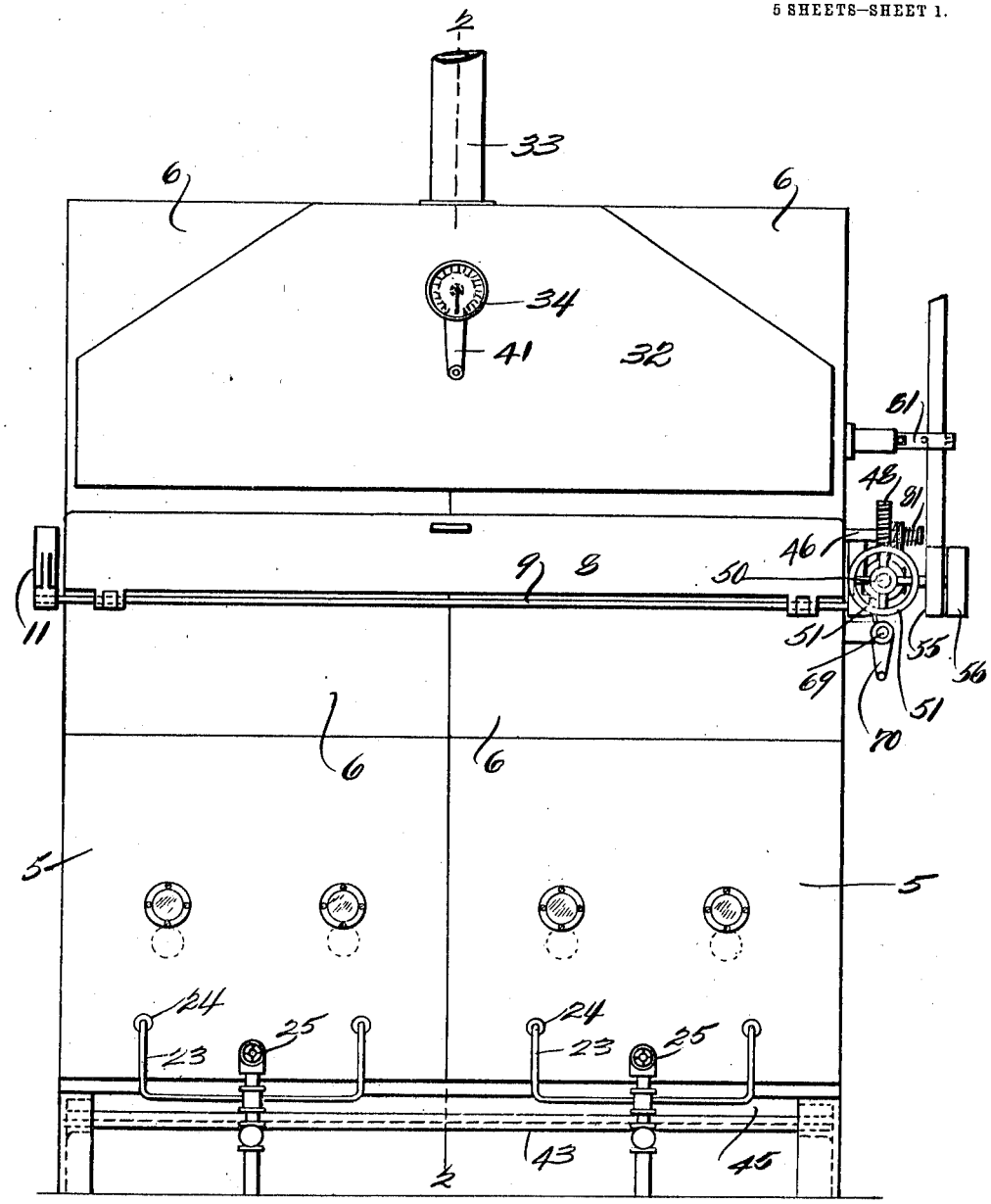
Figure 5:
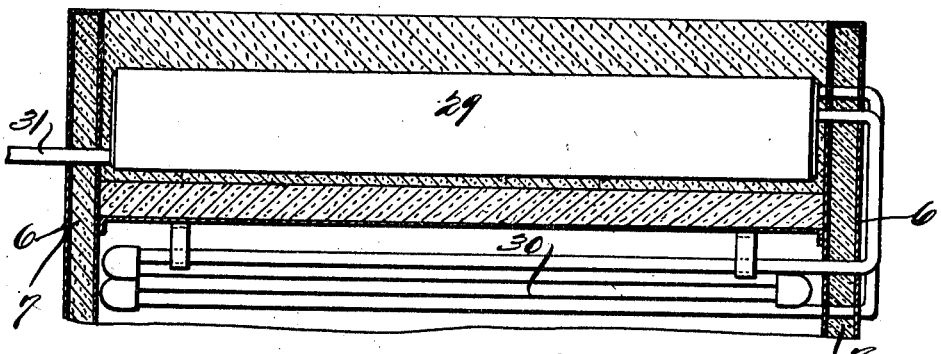
Figure 6:
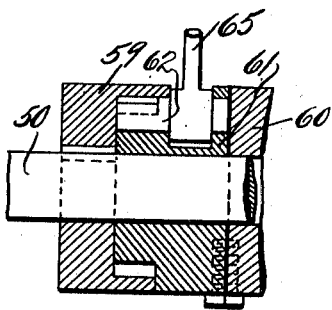
Figure 7:
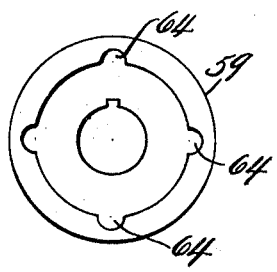
Figure 8:
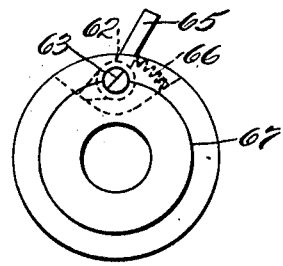
Figure 9:
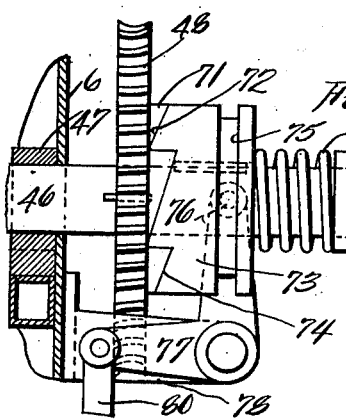
Figure 10:
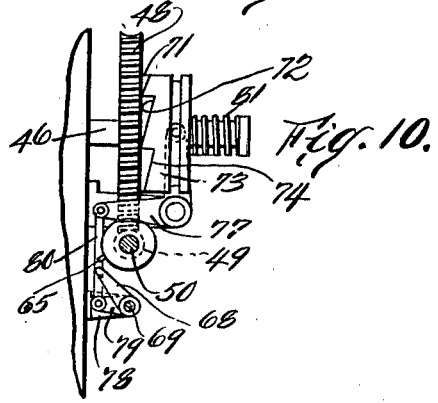

I will now proceed to describe my invention in detail, the novel features of which I will finally point out in the claims, reference being had to the accompanying drawings forming part hereof, wherein:

Figure 1 illustrates a front view of my improved oven; Fig. 2 is a vertical sectional view thereof, the section being taken on a line 2—2 in Fig. 1; Fig. 3 is a sectional plan view, the section being taken on a line 3—3 in Fig. 2; Fig. 4 is an enlarged detail front view of one of the cradles, the hollow bottom of said cradle being shown in section; Fig. 5 is a sectional detail view, the section being taken on a line 5—5 in Fig. 2; Fig. 6 is an assembled sectional view of one form of clutch, which I may use in connection with my improved oven; Fig. 7 is a face view of the socket member of said clutch; Fig. 8 is a face view of the gripping member of said clutch; Fig. 9 is a detail view showing one form of device for automatically arresting the movement of the rotary carrier; Fig. 10 is a sectional view, taken on a line 10—10 in Fig. 11, showing details of the throw-out mechanism; and Fig. 11 is an enlarged side elevation, showing the carrier operating mechanism.

Referring to the drawings, which illustrate one form in which my improved oven may be embodied, and especially to Fig. 2, it will be seen that my improved oven comprises a front wall 1, a rear wall 2, and side walls 3 and 4 (see also Fig. 3). It will be also seen by referring to the said figures that the lower portion of the walls of my improved oven comprises removable hollow sections 5, while the upper portion of the walls of the oven is made up of hollow sections 6, which in turn are insulated or jacketed by being filled with asbestos, mineral wool or other non-heat conducting material, which is herein indicated by 7.

By referring to Figs. 1 and 2, it will be seen that the front wall 1 is provided with a door 8, pivotally secured to said wall, as at 9. The door 8 is provided to close an opening 10 in said front wall through which the articles may be introduced into the furnace and taken out therethrough. The bar 9 which pivotally secures the door in position is provided at each end thereof with counterweights 11, said weights being sufficiently heavy to keep the door 8 closed.

The means which I employ to support the articles in the oven while being baked comprises a plurality of cradles or supports 12, which are carried by a bar 13, which in turn is pivotally supported at the outer ends of arms 14 of a rotary carrier 15, the said carrier, in this instance, consisting of two spiders one adjacent each of the side walls of the oven, there being but one of the said spiders illustrated in Fig. 2.

It will be seen, by referring to Figs. 2 and 3, that the bottom portion of the cradles 12 consist of a hollow or box-like structure 13ª, the space 14ª of which contains air, the said air acting as an insulator or jacket, to prevent the overheating of the said cradle, as it passes during its rotation through the lower portion of the oven.

A further feature of my invention consists of the angularly disposed portions 16 adjacent the top of and within the oven. The portions or walls 16 comprise a suitable support 17 upon which is placed or molded a heat conserving element 18, which may consist of fire brick or other material adapted to resist the passage of heat therethrough.

It will be seen, by referring to Fig. 2, that the top of the oven is covered by panels or sections 19 similar to the panels 6. It will be also seen, by referring to Fig. 2, that the space 20 between the adjacent upper edges of the walls 18 is covered by a panel and is not provided with a heat conserving element.

To supply heat to the oven I have, in this instance, employed a gas-heating device, which comprises the main ducts 20 to which are connected perforated pipes 21, the ducts 20, or rather the outer ends thereof, pass through the front panel 5, to which outer ends suitable gas mains 22 are connected. To at all times provide means for igniting the gas in the oven, I employ ducts 23, the upper outer ends of which are directed toward the openings 24 in the panels 5. The gas from the ducts 23, when ignited, serves as a pilot light, which burns continuously. A valve 25 controls the flow of gas in the ducts 20 and perforated pipes 21.

As the heating device is situated in the lower portion of the oven and as the cradles 12 pass close to the said heating device during a portion of their rotation, and also as the said trays are stopped at certain periods adjacent the opening 10 in the front wall of the furnace, it is necessary that a baffling device be placed over and adjacent to the heating device, in order that the trays which come to rest at the lower portion of the oven and adjacent said heating device, will not become overheated during their period of rest.

The baffling device which I have herein illustrated comprises a platform 26 composed of a non-heat conducting material such, for instance, as fire brick, the said baffling device being suitably supported upon an angle-iron frame 27, which in turn is supported by brackets 28.

A further novel feature of my improvement comprises a receptacle 29, which is placed in the space between the upper rear panel 6 and adjacent angular wall 16, the receptacle 29 being adapted to contain water, and being connected by suitable piping to a coil 30 within the boiler (see Figs. 2 and 5). A pipe 31 is also provided through which cold water can be introduced into the receptacle 29. A take-off pipe 30ª, having a valve 31ª, is provided for the purpose of drawing from the receptacle 29 heated water, which may be used for any purpose about a bakeshop.

When a cradle 12 is caused to stop in alinement with the opening 10 in the wall 1 of the oven, and when the door 8 is open for the purpose of extracting the material from said cradle, or for introducing uncooked material into the oven, a great amount of heat will pass out through the uncovered opening. In order that the heat which passes out through the uncovered opening may be carried upwardly, I provide a hood 32, having connected thereto a draft pipe 33. The heat, which passes out through the opening 10, will pass upwardly through the hood 32 and pipe 33, instead of into the bakehouse.

To enable an operator to ascertain the temperature within the oven, I provide a thermostat 34, which has connected thereto, a pipe 35, the inner end of which is adjacent an opening 36 in the front angular wall 16 of the oven. The heat within the oven will actuate the thermostat by passing through the pipe 35.

To regulate the temperature within the oven, I provide a regulating device, which comprises a tube 37, having rotatably mounted therein a tube 38, provided with an opening 39, which is adapted to aline with an opening 40 in the tube 37, the tube 38 constituting a valve. To rotate the tube 38, I provide a handle 41 which closes the outer end thereof. It may be here stated that the thermostat pipe 35 passes freely through the hub of the handle 41, thereby adapting the said handle and tube 38, secured thereto, for rotation.

Should the temperature of the oven become too great, the operator would rotate the valve 38 to cause the opening 39 therein to aline with the opening 40 in the tube 37. When the openings 39 and 40 aline, some of the heated air in the oven will pass out therefrom and upwardly through a flue 42. When the temperature in the oven has lowered to the required extent, the valve 38 may be turned backwardly, in order to close the opening 40.

By referring to Fig. 2, it will be seen that a plate 43 extends the length of the oven, and by referring to Fig. 1, it will be seen that the said plate extends the width of the oven. The plate 43 is placed slightly away from the bottom frame-work 44 of the oven, whereby a space 45 is provided. The object of providing a space 45 is to produce an inlet for air to promote combustion, the bottom of the oven proper being open.

Notwithstanding that I provide a baffle 26 to prevent the overheating of the trays 12, I find it advantageous to still further protect the articles upon said trays, when said trays come to rest adjacent the heating device or during their movement in proximity thereto. For the above reason, I have provided hollow trays as herein illustrated and described. Due to the fact that the trays are hollow and contain air, an insulation is provided between the baffle 26 and articles upon the tray.

To produce an oven within which an even baking temperature can be maintained is one of the principal objects of my invention, and for this reason, I have constructed an oven, as illustrated in the drawing.

As that part of the oven which contains the heating device will be the hottest part, I preferably provide walls which are only partially insulated, the said partially insulated walls being the walls 5 hereinbefore referred to. As the said walls 5 are hollow, they are to a large extent insulated by the air within them. The walls 5 will not, however, entirely prevent the escape of heat, but will do so to some extent. As that portion of the oven which is composed of the sections or panels 5 is the hottest part of the oven, it is desirable that a certain amount of heat be conveyed away therefrom.

As the central portion of the oven is somewhat cooler than the lower portion, I prefer to form the same by insulated panels which are the central panels 6 hereinbefore referred to. As the said panels are filled with a non-heat conducting material they will resist the radiation of the heat and will therefore tend to equalize the heat at the bottom and central portions of the oven.

To collect and conserve the heat in the coolest or upper part of the oven, I provide the angular walls 16 hereinbefore referred to. The space 20 at the upper portion of the oven is covered by an insulated panel 19 through which a small amount of heat may escape, thereby preventing the upper portion of the oven from becoming hotter than the central portion thereof.

I will now proceed to describe the mechanism for rotating and automatically checking the rotation of the carrier 15. As can be seen in Fig. 2, the carrier 15 is carried by a shaft 46, which is suitably supported by bearings 47 in the walls 3 and 4 (see Figs. 2 and 9). As can be seen in Fig. 9, adjacent the outer end of the shaft 46, I secure a worm wheel 48, having in mesh therewith a worm 49, carried by a shaft 50 (see Figs. 10 and 11), the outer end of which is provided with a hand wheel 51, whereby the shaft 50 can be rotated. By means of the worm and gear above described the carrier 15 can be rotated when the shaft 50 is operated.

To operate the carrier by power, I loosely mount upon the shaft 50 a beveled gear 52, having in mesh therewith a pinion 53, which in turn is carried by a countershaft 54, the said countershaft being provided with a tight and loose pulley 55 and 56 respectively. The countershaft 54 is suitably supported in the bracket 57.

To control the operation of the gear 52, I provide a clutch mechanism 58, which comprises the socket member 59 which is keyed to the shaft 50. To the hub 60 on the gear 52 I secure a coöperating clutch member 61, which is provided with a rotatable pin 62, having a flattened surface 63. The flattened end of the pin 62 is adapted to enter recesses 64 in the socket member 59. When the pin 62 is in the position shown in Figs. 6 and 8, the clutch members 59 and 61 will be locked together, thereby causing the gear 52 to rotate should either the shaft 50 or countershaft 54 be operated.

As can be seen in Figs. 6 and 8, the pin 62 is provided with an arm 65, the said arm being backed by a spring 66. When the arm 65 is moved backwardly against the tension of the spring the flattened surface 63 of the pin 62 will aline with the surface 67 of the clutch member 61, thereby disconnecting the said clutch members 58 and 59. When the arm 65 is moved, as above described, the carrier 15 will cease rotating. The arm 65 is moved to disconnect the clutch member by means of an arm 68 carried by a shaft 69 (see Figs. 10 and 11), the said shaft being manually operated to cause the arm 68 to move into the path of the arm 65 on the pin 62 by means of a lever 70 (see Fig. 11). The carrier 15 may be caused to come to rest at any time by causing the lever 68 to move into the path of movement of the arm 65 on the pin 62.

To automatically cause the carrier 15 to come to rest I provide the worm gear 48 with a cam 71, the said cam being provided with angular surfaces 72, or rather wedges, there being as many wedges 72 as there are arms on the carrier 15, in this instance 6.

To coöperate with the wedges 72 I mount upon the shaft 46 (see Fig. 9) a movable block 73, provided with wedges 74, adapted to contact with the wedges 72. The block 73 is provided with annular groove 75, in which a pin 76 carried by a bell-crank lever 77 enters, the bell-crank lever being pivotally mounted on a bracket 78. To operate the shaft 69 in order that the arm 68 may be caused to move into the path of rotation of the arm 65, I provide the said shaft 69 with an arm 79 (see Fig. 10), which arm is connected to the bell-crank lever 77, by a link 80.

As the carrier 15 rotates, the block 73 will be caused to move outwardly against the tension of a spring 81. During the outward movement of said block the bell-crank lever will rock, thereby, by means of the link 80, rocking the shaft 69, which will cause the upper end of the arm 68 to approach the path of rotation of the arm 65. At about the time that the highest portions of the wedges 72 and 74 aline, the arm 68 will have been moved into the path of rotation of the arm 65. When the arm 65 contacts with the upper end of the arm 68 the said arm 65 will be moved to cause the flattened surface 63 of the pin 62 to aline with the surface 67 of the clutch member 68, thereby disconnecting the clutch members 58 and 59, at which time the carrier 15 will come to rest, the device being so timed as to cause a tray 12 to aline with the opening 10 in the front wall of the oven. Referring to Figs. 1 and 11, it will be seen that I provide a belt shifter 81 for the purpose of stopping the rotation of the pulleys 55 and 56 for the purpose of reversing the movement of the carrier by means of the hand wheel 51, should a tray overreach the opening 10.

By referring to Fig. 2, it will be seen that the bottom plate 43 consists of a pan adapted to contain water, indicated by 82. The object of providing a receptacle for water is to supply moisture for the article being baked.

While baking some articles, especially those containing a great amount of sugar, it is desirable that considerable moisture be used. To that end I place upon the platform 26 a pan 83 which is adapted to contain water, water being introduced to the pan through a pipe 84.

Having now described my invention, what I claim and desire to secure by Letters Patent is:

1. An oven consisting of a plurality of walls, the upper portion of said walls being insulated, the lower portion of said walls being hollow, a top, a portion of said top consisting of refractory material, and a pan adapted to contain water located at the bottom of said oven.

2. An oven consisting of a plurality of walls, the upper portion of said walls being insulated, the lower portion of said walls being hollow, a top, a portion of said top consisting of refractory material, a pan adapted to contain water located at the bottom of said oven, means adapted to heat said oven, a flue in communication with the interior of said oven, and a rotatable valve adapted to normally close said flue.

3. An oven consisting of a plurality of side walls, a top, angularly disposed walls extending from the front and rear walls of said oven to the top of said oven, one of said angularly disposed walls being provided with an opening, a flue in communication with said opening, and a valve adapted to control the flow of hot gases through said flue.

Signed at New York city, N. Y., this 19th day of June, 1911.

EMILE HÉRISSÉ.

Witnesses:
EDWARD A. JARVIS,
ESTELLE O. HAMBURGER.